Patented Feb. 11, 1930

1,746,615

UNITED STATES PATENT OFFICE

FREDERICK W. SKIRROW, OF SHAWINIGAN FALLS, QUEBEC, CANADA, ASSIGNOR TO CANADIAN ELECTRO PRODUCTS COMPANY, LIMITED, OF MONTREAL, CANADA

SYNTHETIC GUMMY OR RESINOUS MATERIAL AND PROCESS OF MAKING SAME

No Drawing.   Application filed August 15, 1927.   Serial No. 213,197.

This invention relates broadly to the manufacture of synthetic gummy or resinous materials by the interaction or treatment of vinyl esters with saturated aliphatic aldehydes or aldehydic bodies, the term "vinyl esters" as herein used including vinyl halides.

In a copending application, a process is described for the manufacture of synthetic materials as aforesaid by means of heat and pressure.

According to the present invention, the reacting bodies are subjected to the action of rays such as obtained from the sun or from an arc or other suitable lamp substantially without application of heat and pressure and the reaction goes more rapidly and completely than when using heat and pressure only. A source of light which has been found satisfactory is an ordinary mercury vapour arc lamp and a vessel satisfactory for carrying out the process is one composed of ordinary pyrex glass. The rays effective in promoting the reaction are thought to lie largely in the visible spectrum. Ultraviolet rays have been found to be comparatively ineffective, their action having been tested by utilizing a quartz tube as container and a suitable screen for filtering out the visible rays of light. With sufficient intensity of light, the reaction will take place at atmospheric temperature or slightly higher and without pressure, but heating and pressure may be resorted to if desired.

When using more than five parts of aldehyde to 100 parts of vinyl compound, it is found that a better yield of product is obtained when using light than is obtained from the use of heat and pressure alone.

Apparatus suitable for carrying out the reaction consists of a pyrex container connected to a reflux condenser or a container of porcelain, enamel or aluminum associated with tubes of pyrex glass through which the reaction mixture may be circulated for exposure to light. Vessels of iron and copper are found to be unsatisfactory.

The following examples will serve to illustrate various methods of carrying out the invention, but it will be understood that the invention is not confined to the particular materials, proportions or modes of treatment set forth, but is capable of many variations therefrom.

Example I

One part of acetaldehyde and 100 parts of vinyl acetate (by volume) are placed in apparatus of the character described and maintained at a temperature around 30° to 40° C. for a period of sixteen hours. Unreacted ester and aldehyde may be removed by distillation preferably with steam and approximately 10 parts of product will be obtained, which is hard at ordinary temperatures but is tough and rubbery when warmed.

Example II

Proceeding as in Example I but using two parts of aldehyde to 100 parts of vinyl acetate, approximately 40 parts of product are obtained.

Example III

Proceeding as in Example I and using 5 parts of aldehyde to 100 parts of vinyl acetate, approximately 95 parts of product are obtained.

Example IV

Proceeding as in Example I but using 10 to 15 parts of aldehyde to 100 parts of vinyl acetate, approximately 100 parts of product are obtained. This product, which is comparatively hard at room temperature, softens when warmed to body temperature and becomes freely plastic and ductile and of about the consistency of ordinary chewing gum. It exhibits the characteristic of taking up a certain amount of water when treated therewith.

Example V

Proceeding as in Example I but using 25 parts of aldehyde to 100 parts of vinyl ester, approximately 105 parts of product are obtained, which is somewhat softer than obtained when working according to the preceding example.

Example VI

Proceeding according to Example I but using 100 parts of aldehyde to 100 parts of vinyl ester, there is obtained approximately 100 parts of product which is a sticky plastic.

Example VII

Proceeding as in Example I but using 300 parts of aldehyde to 100 parts of ester, there is obtained approximately 90 parts of product which is a heavy liquid of a consistency somewhat similar to treacle.

Example VIII

Proceeding as in Example I but using 900 parts of aldehyde to 100 parts of ester, there is obtained approximately 75 parts of product which is a freely mobile liquid.

It will be observed from the foregoing examples that the character of the product changes according to the amount of aldehyde used, progressively softer products being obtained as the amount of aldehyde is increased.

The following tabulation of results which have been obtained is further indicative of the invention:—

| Vol. AcH per 100 vol. vinyl acetate | Subjected to the effect of mercury arc lamp for a period of 16 hrs. (parts produced per 100 parts vinyl acetate) |
|---|---|
| Less than .1 | 0 |
| 1 | 9.8 |
| 2 | 40.8 |
| 3 | 65.8 |
| 4 | 95.5 |
| 5 | 95.1 |
| 6 | 103.2 |
| 8 | 95.6 |
| 10 | 98.4 |
| 12 | 100.6 |
| 14 | 101.0 |
| 20 | { 98.9 / 96.4 } |
| 25 | 105.2 |
| 33.3 | 102.2 |
| 50 | 102.0 |
| 100 | 101 |
| 300 | 92.8 |
| 900 | 75 |

In carrying out the process according to this invention, the presence or absence of oxygen makes very little observable difference either in the speed of reaction or in the product.

For satisfactory results it is essential that the materials used be of a certain degree of purity, since the presence of certain impurities has detrimental effect on the reaction or may completely inhibit the reaction. Sulphur, completely inhibits the reaction while iron, copper and certain of the compounds of these elements have detrimental effect, hence the former observation that vessels of iron and copper are to be avoided.

While the only materials disclosed in the examples are acetaldehyde and vinyl acetate, similar results may be obtained using vinyl formate, vinyl butyrate and vinyl esters of higher molecular weight, also vinyl halides. Also, various other aldehydes such as formaldehyde, butyraldehyde and aldehydes of higher molecular weight may be substituted for acetaldehyde.

The term "aldehydic body" as herein used refers to bodies which will liberate an aldehyde during the progress of the reaction, for example, paraldehyde, especially if a trace of mineral acid is present to decompose the same. In the same way, bodies of the acetal type may be utilized under conditions which will liberate aldehyde.

While the only temperature referred to in the examples is around 30° to 40° C., it will be understood that great variation may be made in this respect and, generally speaking, the temperature range may be placed between 20° and as far above 100° C. as it is possible to go without detrimental decomposition of the product or constituents of the reaction mixture. Also, pressures materially above atmospheric may be employed, especially with elevated temperatures. Intensity of light has considerable effect upon the speed of reaction and it is therefore desirable to place the mercury arc lamp close to the reaction apparatus. The invention is not confined to use of the mercury arc lamp but extends to other suitable forms of artificial light and also to direct or diffused sunlight. It will be understood that, while the proportions given in the examples range between one part and 900 parts of aldehyde to 100 parts of ester, the invention is not limited to this range.

Having thus described my invention, what I claim is:—

1. A process of making gummy or resinous products from vinyl esters, which comprises reacting together the vinyl body and a saturated aliphatic aldehyde with exposure to light and with heating.

2. A process of making gummy or resinous products, which comprises reacting together a vinyl ester and a saturated aliphatic aldehyde with exposure to light.

3. A process of making gummy or resinous products, which comprises reacting together a vinyl ester and acetaldehyde with exposure to light.

4. A process of making gummy or resinous products, which comprises reacting together vinyl acetate and a saturated aliphatic aldehyde with exposure to light.

5. A process of making gummy or resinous products, which comprises reacting together vinyl acetate and acetaldehyde with exposure to light.

6. A process of making gummy or resinous products, from vinyl esters, which comprises reacting together 100 parts of the vinyl body and 1 to upwards of 900 parts of a saturated aliphatic aldehyde with exposure to light.

7. A process of making gummy or resinous products from vinyl esters, which comprises reacting together 100 parts of the vinyl body and 1 to upwards of 900 parts of a saturated aliphatic aldehyde with exposure to light and with heating.

8. A process according to claim 2 in which the light used is that of a mercury vapour lamp.

9. A process according to claim 5, in which the light used is that of a mercury vapour lamp.

10. Compositions of matter resulting from reacting together vinyl esters and a saturated aliphatic aldehyde with exposure to light.

11. Compositions of matter resulting from reacting together vinyl esters and a saturated aliphatic aldehyde with exposure to light and with heating.

12. A composition of matter resulting from reacting together a vinyl ester and a saturated aliphatic aldehyde with exposure to light.

13. A composition of matter resulting from reacting together a vinyl ester and acetaldehyde with exposure to light.

14. A composition of matter resulting from reacting together vinyl acetate and a saturated aliphatic aldehyde with exposure to light.

15. A composition of matter resulting from reacting together vinyl acetate and acetaldehyde with exposure to light.

16. Compositions of matter resulting from reacting together 100 parts of vinyl esters and 1 to upwards of 900 parts of a saturated aliphatic aldehyde with exposure to light.

17. Compositions of matter resulting from reacting together 100 parts of vinyl esters and 1 to upwards of 900 parts of a saturated aliphatic aldehyde with exposure to light and with heating.

In witness whereof, I have hereunto set my hand.

FREDERICK W. SKIRROW.